(12) United States Patent
Sakami et al.

(10) Patent No.: US 7,824,100 B2
(45) Date of Patent: Nov. 2, 2010

(54) TEMPERATURE MEASUREMENT DEVICE THAT ESTIMATES AND COMPENSATES FOR INCIDENT RADIATION

(75) Inventors: Mohamed Sakami, Clifton Park, NY (US); Fulton Jose Lopez, Clifton Park, NY (US); Hongmei Zhang, Niskayuna, NY (US); Shobhana Mani, Houston, TX (US); Robert Michael Zirin, Niskayuna, NY (US); James Michael Storey, Houston, TX (US); Aaton John Avagliano, Houston, TX (US); David Howard Syck, Mableton, GA (US)

(73) Assignee: General Electric Company, Niskayuna, NY (US)

( * ) Notice: Subject to any disclaimer, the term of this patent is extended or adjusted under 35 U.S.C. 154(b) by 344 days.

(21) Appl. No.: 11/835,912

(22) Filed: Aug. 8, 2007

(65) Prior Publication Data
US 2009/0041084 A1 Feb. 12, 2009

(51) Int. Cl.
*G01K 15/00* (2006.01)
*G01K 7/02* (2006.01)
*G01N 25/30* (2006.01)

(52) U.S. Cl. .......................... 374/147; 374/1; 374/179; 374/10; 374/E17.008; 374/E7.004; 73/23.25

(58) Field of Classification Search .............. 250/338.1, 250/343, 345, 339.13; 136/200; 73/23.2, 73/23.25, 23.26
See application file for complete search history.

(56) References Cited

U.S. PATENT DOCUMENTS

| | | | | |
|---|---|---|---|---|
| 2,472,808 A * | 6/1949 | Dahl | ........................... | 136/231 |
| 2,496,774 A * | 2/1950 | Buck | ........................... | 136/231 |
| 2,635,468 A * | 4/1953 | Field et al. | .................. | 374/132 |
| 3,286,524 A * | 11/1966 | Malone | ....................... | 374/107 |
| 3,387,134 A * | 6/1968 | Treharne | ..................... | 250/349 |
| 3,535,523 A * | 10/1970 | Bridgham et al. | ........... | 250/351 |
| 3,592,058 A * | 7/1971 | Benson et al. | ........... | 73/204.24 |
| 3,776,039 A * | 12/1973 | Bowen | ........................ | 374/147 |
| 3,935,032 A | 1/1976 | Brandeberry et al. | | |
| 4,038,105 A | 7/1977 | Brandeberry et al. | | |
| 4,187,434 A | 2/1980 | Pater, Jr. et al. | | |
| 4,594,051 A * | 6/1986 | Gaston | ......................... | 415/48 |
| 4,599,975 A * | 7/1986 | Reeve et al. | ................. | 122/379 |
| 4,615,302 A * | 10/1986 | Wynnyckyj et al. | ......... | 122/379 |
| 4,659,234 A * | 4/1987 | Brouwer et al. | ............. | 374/121 |
| 4,772,790 A * | 9/1988 | Aldridge | ...................... | 250/343 |
| 4,778,538 A * | 10/1988 | Lyman | ........................ | 136/230 |
| 5,038,303 A * | 8/1991 | Kimura | ....................... | 702/130 |
| 5,061,083 A * | 10/1991 | Grimm et al. | ................ | 374/112 |
| 5,228,114 A * | 7/1993 | Suzuki | ......................... | 392/416 |
| 5,275,553 A * | 1/1994 | Frish et al. | .................... | 431/76 |
| 5,296,706 A * | 3/1994 | Braig et al. | ............. | 250/339.13 |
| 5,348,395 A * | 9/1994 | Corr et al. | .................... | 374/135 |
| 5,695,283 A * | 12/1997 | Johnson | ....................... | 374/133 |
| 5,764,684 A * | 6/1998 | Pompei | ........................ | 374/126 |

(Continued)

*Primary Examiner*—Gail Verbitsky
(74) *Attorney, Agent, or Firm*—Ann M. Agosti

(57) ABSTRACT

A temperature measurement device includes a first thermocouple mounted on a tubular body that is shielded from the effects of radiation by a radiation shield, and a second, unshielded thermocouple. A difference in the measured temperatures from the first and second thermocouples is compared with calculated temperatures using an iterative process to determine a corrected temperature of the gas stream that estimates and compensates for incident radiation.

9 Claims, 2 Drawing Sheets

U.S. PATENT DOCUMENTS

| | | | | |
|---|---|---|---|---|
| 6,072,163 | A * | 6/2000 | Armstrong et al. | 219/497 |
| 6,114,700 | A * | 9/2000 | Blades | 250/343 |
| 6,277,081 | B1 * | 8/2001 | Susi et al. | 600/532 |
| 6,300,554 | B1 * | 10/2001 | Du et al. | 136/201 |
| 6,402,372 | B1 * | 6/2002 | Saunders | 374/179 |
| 6,528,792 | B2 * | 3/2003 | Johnson et al. | 250/339.13 |
| 6,694,800 | B2 * | 2/2004 | Weckstrom et al. | 73/25.01 |
| 6,818,895 | B2 * | 11/2004 | Williams | 250/343 |
| 6,973,398 | B2 * | 12/2005 | Gauthier et al. | 702/99 |
| 7,378,662 | B2 * | 5/2008 | Tsuchiya et al. | 250/370.08 |
| 2006/0045164 | A1 * | 3/2006 | Schuh et al. | 374/1 |
| 2008/0040067 | A1 * | 2/2008 | Bashor et al. | 702/132 |

* cited by examiner

TEMPERATURE MEASUREMENT DEVICE THAT ESTIMATES AND COMPENSATES FOR INCIDENT RADIATION

BACKGROUND

The invention relates in general to temperature measurement devices, and in particular, to a temperature measurement device using a dual thermocouple arrangement with an unshielded thermocouple and a shielded thermocouple to estimate and compensate for incident radiation when determining a temperature of a gas stream.

Aspirating pyrometers, also known as suction pyrometers, are used to measure extraordinarily high temperature gas streams, such as up to 2800 F. For example, high temperature pyrometers are used to measure temperatures in combustors of gas turbines and in gasification applications. Combustor temperatures must be measured or estimated to properly evaluate performance of the combustor and gas turbine. However, no commercially available pyrometer has been able to withstand the hot gas temperatures in advanced, high-firing-temperature, combustion-test stands. Pyrometers also have limitations in measuring the local temperature of gases.

Because prior pyrometers cannot withstand such hot gas temperatures, gas analysis has been used to estimate the temperature in combustors. However, direct temperature measurement, such as with a thermocouple, is preferable to gas analysis because direct temperature measurement can provide a near actual gas stream temperature instead of an estimated temperature. In addition, gas analysis is complex, expensive and slow relative to thermocouple measurement. Accordingly, a long-felt need has existed for devices that directly measure temperatures of gas streams in combustion test stands.

A thermocouple measures the temperature of the thermocouple junction. Thus, to measure the temperature of a gas stream, the thermocouple junction must attain the same temperature as the gas stream. On a superficial level, it may seem that positioning the thermocouple in the gas stream should cause the junction to attain the temperature of the gas. However, the thermocouple temperature is not a function solely of the gas temperature surrounding the thermocouple. The temperature of a thermocouple in a gas stream is a function of the steady state condition where the rate of heat transfer to the thermocouple junction balances the rate of heat transfer from the junction. The temperature of a gas stream around the junction is only one factor affecting this steady state temperature condition.

The steady state temperature condition of a thermocouple junction in a gas stream results principally by the balancing of four known thermocouple phenomena: (1) heat transfer from the gas stream to the thermocouple by convection, (2) heat transfer between the thermocouple and its surrounding by radiation, (3) heat transfer between the thermocouple junction and its wires by conduction, and (4) conversion of kinetic energy to thermal energy at the boundary layer surrounding the thermocouple.

The accuracy of measuring gas stream temperatures with a thermocouple depends to a large extent on how close the thermocouple junction can be brought to the gas stream temperature. The devices are designed to match the temperature of the thermocouple junction to the gas temperature. For example, an aspirating thermocouple increases the effect of convection heat transfer from the gas stream to the thermocouple junction by increasing the gas stream velocity across the thermocouple. Aspirating devices enhance the convection heat transfer between the gas stream and thermocouple to cause the thermocouple junction to better attain the actual gas stream temperature. Aspirating thermocouples enhance the convection heat transfer to diminish the effect of the other phenomena affecting the thermocouple junction temperature.

Aspirating thermocouples are designed to reduce the phenomena, other than that of convection between the gas and thermocouple that affect the steady state temperature condition of a thermocouple junction. The effect of incident radiation on a thermocouple junction from its surrounding environment influences the steady state temperature condition of a thermocouple. The effect of incident radiation on a thermocouple varies in proportion to the fourth power of temperature. Accordingly, the effect of incident radiation predominates the other phenomena affecting the steady state condition of a thermocouple. In one example, the incident radiation produced by a gas stream at extraordinarily hot temperatures, such as in the combustors of gas turbines, a gas stream in gasification applications, and the like, predominates the other phenomena affecting the steady state condition of the thermocouple. Because the thermocouple must be exposed to the gas stream to measure the temperature of the gas stream, it is impossible to prevent some incident radiation produced by the gas stream from effecting the temperature measurement of the gas stream. However, it is highly desirable to reduce the effect of incident radiation that is produced by the gas stream distal to the thermocouple on the temperature measurement of the gas stream.

BRIEF DESCRIPTION

Briefly, one aspect of the invention resides in a temperature measurement device that compensates for incident radiation comprising a body, a first thermocouple mounted on the body for measuring a first temperature, a second thermocouple mounted on the body for measuring a second temperature, the second thermocouple being unshielded from incident radiation of a gas stream; and a radiation shield for shielding the first thermocouple from incident radiation, wherein the first and second temperatures are used to determine a corrected temperature of the gas stream based on an estimation of incident radiation on one of the first and second thermocouples.

Another aspect of the invention resides in a method of measuring temperature by estimating and compensating for incident radiation, comprising the steps of:

measuring a first temperature of a gas stream using a first thermocouple, the first thermocouple being shielded from incident radiation of the gas stream by a radiation shield;

measuring a second temperature of the gas stream using a second thermocouple, the second thermocouple being unshielded from incident radiation of the gas stream;

determining an estimate of incident radiation on one of the first and second thermocouples based on a difference between the measured first and second temperatures and calculated first and second temperatures; and determining a corrected temperature of the gas stream based on the estimate of incident radiation.

In another aspect of the invention, a method of measuring temperature by estimating and compensating for incident radiation comprises the steps of:

measuring a first temperature of a gas stream using a first thermocouple, the first thermocouple shielded from radiation from the gas stream by a radiation shield;

measuring a second temperature of the gas stream using a second thermocouple, the second thermocouple being unshielded radiation of the gas stream;

determining a difference between calculated first and second temperatures and the measured first and second temperatures to determine calculated first and second temperatures for the first and second thermocouples, respectively;

determining an incident radiation on one of the first and second thermocouples based on the calculated first and second temperatures; and determining a corrected temperature of the gas stream based on the incident radiation.

In yet another aspect of the invention, a method of determining a temperature of a gas stream, comprising the steps of:

measuring a first temperature of a gas stream using a first thermocouple, the first thermocouple shielded from radiation from the gas stream by a radiation shield;

measuring a second temperature of the gas stream using a second thermocouple, the second thermocouple being unshielded radiation of the gas stream;

determining a difference between calculated first and second temperatures and the measured first and second temperatures to determine calculated first and second temperatures for the first and second thermocouples, respectively;

determining a temperature of the radiation shield based on the calculated first and second temperatures; and determining a corrected temperature of a gas stream based on the incident radiation.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
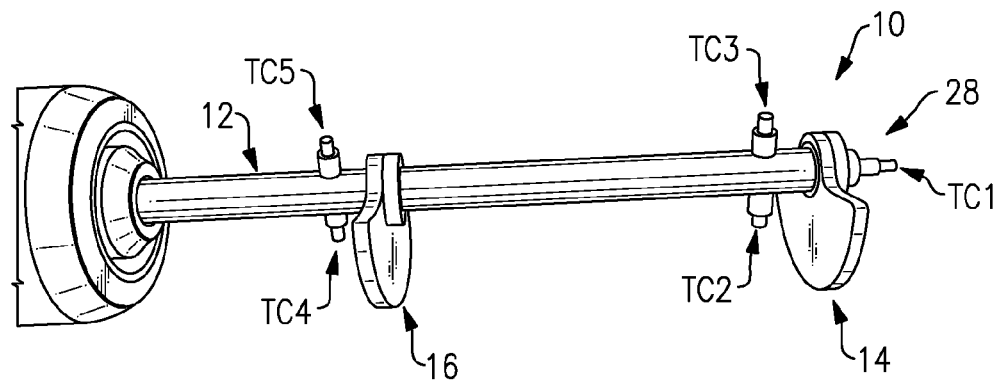
FIG. 1 is a side view of a temperature measurement device with dual thermocouple arrangement for radiation compensation according to an embodiment of the invention.
Figure 2:
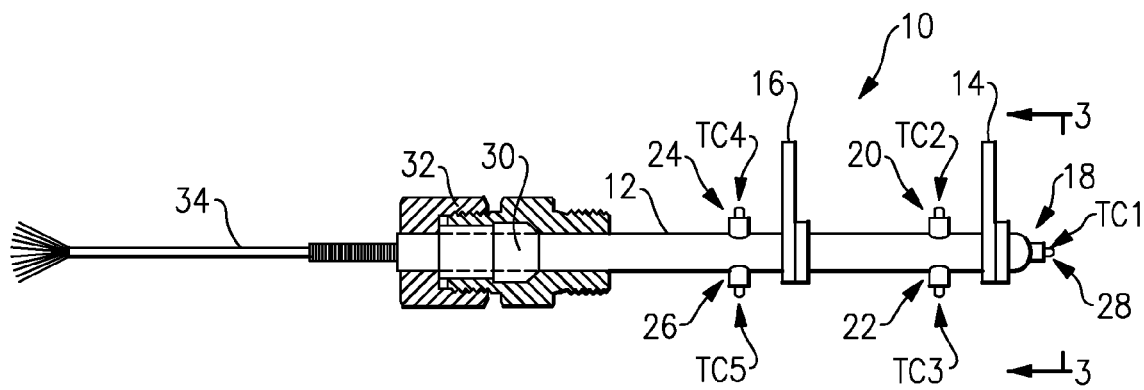
FIG. 2 is a partial cross-sectional side view of the temperature measurement device of FIG. 1.
Figure 3:
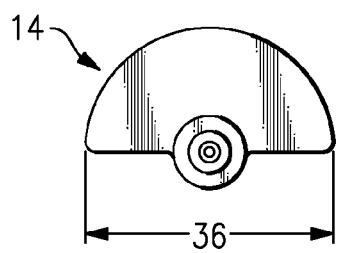
FIG. 3 is an end view of the temperature measurement device taken along line 3-3 of FIG. 2.

Referring to FIGS. 1-3, a temperature measurement device is indicated generally by the reference numeral 10. The temperature measurement device 10 includes a body 12 and a plurality of thermocouples TC1, TC2, TC3, TC4 and TC5 mounted to the body 12. The body 12 can have any desirable shape and can be made of any suitable material. In one embodiment, the body 12 is tubular in shape and is made of a corrosion-resistant ceramic material, such as HEXOLOY®, and the like. In the illustrated embodiment the tubular body 12 has an inner diameter of approximately 0.50 inches (1.27 cm) and an outer diameter of approximately 0.75 inches (1.905 cm). These dimensions may vary depending on the application. The tubular body 12 is designed to house the plurality of insulated conductors 34 from the thermocouples TC1, TC2, TC3, TC4 and TC5. The thermocouples TC1, TC2, TC3, TC4 and TC5 can be mounted to the body 12 using tubular members 18, 20, 22, 24, 26, respectively, made of a corrosion-resistant ceramic material, such as HEXOLOY®, and the like.

In the illustrated embodiment, a total of five thermocouples are shown. The number of thermocouples may vary depending on the application. Specifically, thermocouple TC1 is mounted on a tip 28 of the temperature measurement device 10 for measuring the ambient temperature of the gas stream. Two pairs of thermocouples TC2 and TC3 and TC4 and TC5 are mounted directly opposite each other on the body 12. In other words, thermocouples TC2 and TC3 are mounted directly opposite one another on the body 12, and thermocouples TC4 and TC5 are mounted directly opposite one another on the body 12. However, it will be appreciated that the invention is not limited to the thermocouples being directly opposite one another, and that the invention can be practiced with the thermocouples mounted at any degree of offset, so long as one thermocouple is suitably shielded from the effects of radiation and the other thermocouple is fully exposed or unshielded to the effects of radiation. In the illustrated embodiment, thermocouples TC2 and TC3 and thermocouples TC4 and TC5 are mounted equidistant from the tip 28. In addition, thermocouples TC2 and TC3 are mounted approximately 7.5 inches (19.05 cm) from thermocouples TC4 and TC5. These dimensions may vary depending on the application.

It will be appreciated that the invention is not limited to the use of five thermocouples, and that the invention can be practiced by the use of only one shielded thermocouple and one unshielded thermocouple or any number of shielded/unshielded thermocouples for a specific application.

In one aspect of the invention, the temperature measurement device 10 includes one or more radiation shields 14, 16 that are substantially semi-circular in cross-sectional shape. The radiation shields 14, 16 can be of any arbitrary shape as long as the radiation shield can shield the desired thermocouple, either fully or partially from the incident radiation. For example, the radiation shield may comprise one or more concentric rings that surround the thermocouple positioned in the center of the rings. In another embodiment, the thermocouple may be housed within the body such that the body acts as the radiation shield, rather than mounted on the body as in the illustrated embodiment. Other thermocouple/radiation shield arrangements are contemplated and within the scope of the invention.

The radiation shields 14, 16 can be made of any suitable material. In one embodiment, the radiation shields 14, 16 are made of a corrosion resistant material, such as HEXOLOY®, and have a diameter and thickness sufficiently large to adequately shield a respective thermocouple from the effects of radiation of the gas stream. In one embodiment, the radiation shields 14, 16 have a diameter 36 of approximately 4.2 inches (10.67 cm) and a thickness of approximately 0.25 inches (0.635 cm). These dimensions may vary depending on the application. The shape and the close proximity of the radiation shields 14, 16 prevent the effects of radiation from reaching a particular thermocouple, while allowing the effects of radiation to reach the oppositely positioned thermocouple. For example, radiation shield 14 substantially prevents the effects of radiation from reaching thermocouple TC2, while allowing the effects of radiation to reach thermocouple TC3. Likewise, the radiation shield 16 substantially prevents the effects of radiation from reaching thermocouple TC4, while allowing the effects of radiation to reach the thermocouple TC5. In the illustrated embodiment, the radiation shields 14, 16 are located approximately 0.6 inches (1.524 cm) from the thermocouples TC2, TC3, TC4 and TC5, respectively. These dimensions may vary depending on the application.

The temperature measurement device 10 may also include a sealing member 30 and a fitting 32 for installing of the temperature measurement device 10 in, for example, the wall of a combustor of a gas turbine or a coal gasifier (not shown). The sealing member 30 and fitting 32 are of a type well-known in the art and are not further discussed herein.

Method

In general, the method of the invention corrects for the effect of incident radiation introduced in the gas temperature measurement and also provides an estimate of the incident radiation. First, the temperature associated with the unshielded and shielded thermocouples TC1 and TC2 is measured. Then, iteration is performed to determine the ambient temperature or the shield temperature. Once the ambient temperature or the shield temperature is determined, the incident radiation on the unshielded thermocouple TC1 and the shielded thermocouple TC2 can be determined. Then, the ambient temperature or the shield temperature is used to determine the corrected gas temperature.

Figure 4:
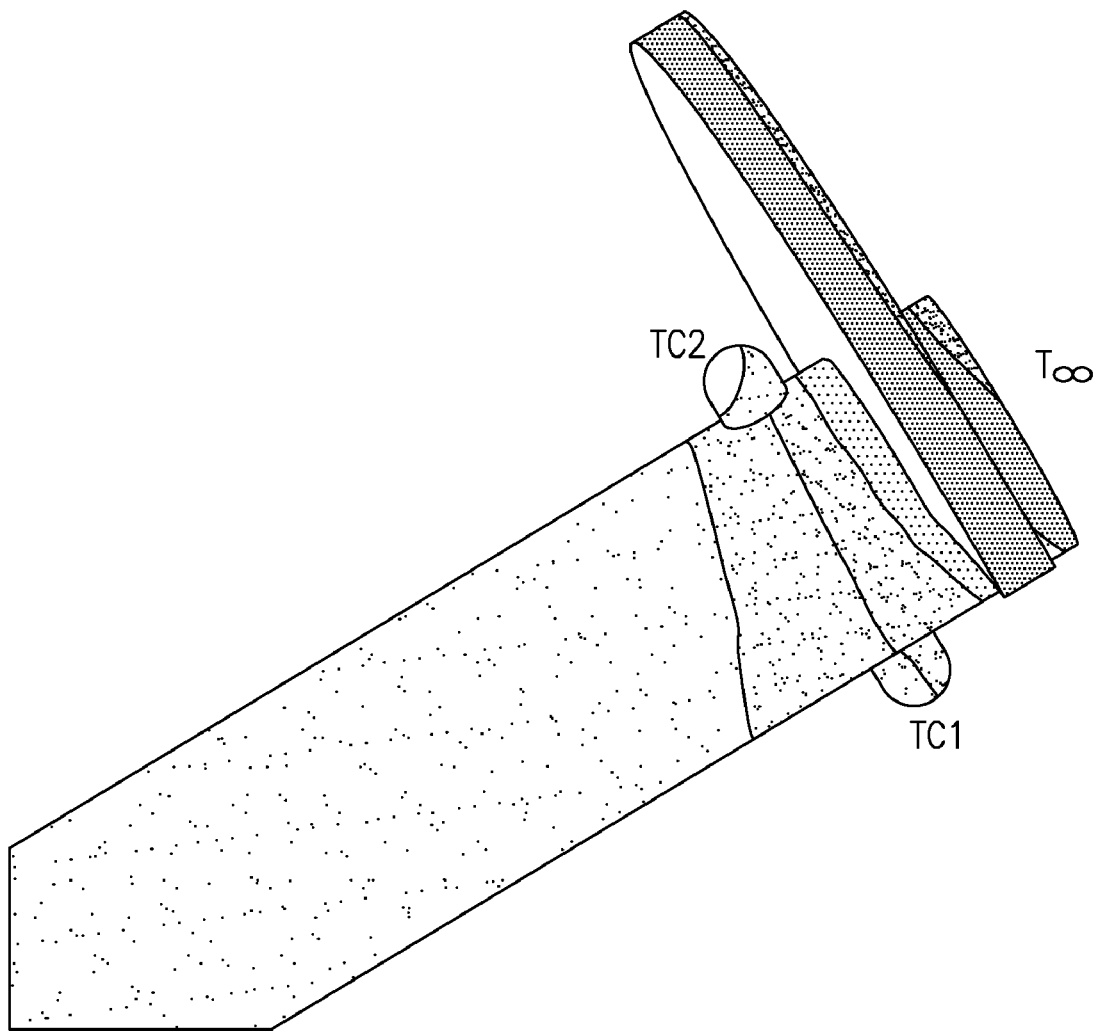
FIG. 4 is a schematic representation of a temperature measurement device with a dual thermocouple arrangement such as the type shown in FIG. 1 for determining a temperature of a gas stream that is corrected for incident radiation by using a method of the invention.

Referring now to FIG. 4, the energy equation for the unshielded thermocouple TC1 is as follows:

$$hA_h(T_g - T_{TC1}) = \varepsilon\sigma A_h T_{TC1}^4 - \varepsilon\sigma A_h F_{TC1} T_\infty^4 - \varepsilon\sigma A_h F_{coldwall} T_{coldwall}^4 - KA_c\left(\frac{dT}{dx}\right) \quad \text{(Eq. 1)}$$

The energy equation for the shielded thermocouple TC2 is as follows:

$$hA_h(T_g - T_{TC2}) = \varepsilon\sigma A_h T_{TC2}^4 - \varepsilon\sigma A_h F_{TC2} T_{shield}^4 - \varepsilon\sigma A_h F_{coldwall} T_{coldwall}^4 - KA_c\left(\frac{dT}{dx}\right) \quad \text{(Eq. 2)}$$

where, h=heat transfer coefficient;
$A_h$=area of the thermocouple, TC1 and TC2;
$\varepsilon$=emissivity of the thermocouple, TC1 and TC2;
$\sigma$=Stefan-Bolzmann constant;
$F_{TC1}$=View factor of the unshielded thermocouple, TC1;
$F_{coldwall}$=View factor of the cold wall;
$F_{TC2}$=View factor of the shielded thermocouple, TC2; and.
K=Thermal conductivity.

Subtracting Eq. (2) from Eq. (1), and assuming that the conduction losses are the same for both TC1 and TC2 yields:

$$hA_h(T_{TC1}-T_{TC2})=\varepsilon\sigma A_h(T_{TC1}^4-T_{TC2}^4)-\varepsilon\sigma A_h(F_{TC1}T_\infty^4-F_{TC2}T_{shield}^4) \quad \text{Eq. (3)}$$

From the temperature measurements $T_{TC1}$ and $T_{TC2}$ provided by the unshielded and shielded thermocouples, respectively, Eq. (3) can be used to solve for $T_\infty$ and $T_{shield}$ using an iterative process. A finite element analysis computer program or any other available solver of a type well-known in the art, such as ANSYS, can be used for this purpose. $T_\infty$ and $T_{shield}$ are determined such that the calculated temperatures for the thermocouples are compared to the measured temperatures $T_{TC1}$ and $T_{TC2}$ to minimize the error between the calculated temperatures and measured thermocouple temperatures. Once $T_\infty$ and $T_{shield}$ are determined, the incident radiation, $\varepsilon\sigma A_h F_{TC1} T_\infty^4$, on the unshielded thermocouple TC1 can be determined. Likewise, the incident radiation, $\varepsilon\sigma A_h F_{TC2} T_{shield}^4$, on the shielded thermocouple TC2 can be determined. Then, the corrected measurement of the gas temperature $T_g$ can be determined by substituting $T_\infty$ into Eq. (1) and/or $T_{shield}$ into Eq. (2).

As described above, the apparatus of the invention comprises a body, a shielded thermocouple mounted on the body that measures a first temperature and an unshielded thermocouple mounted on the body that measures a second temperature, wherein a temperature of a gas stream is determined by a difference in the first and second temperatures measured by the first and second thermocouples, respectively.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A temperature measurement device that estimates and compensates for incident radiation, comprising:
   a body;
   a first thermocouple mounted on the body for measuring a first temperature of a gas stream;
   a second thermocouple mounted on the body for measuring a second temperature of the gas stream, the second thermocouple being unshielded from incident radiation of the gas stream; and
   a radiation shield for shielding the first thermocouple from incident radiation of the gas stream,
   wherein an estimate of incident radiation on one of the first and second thermocouples is determined based on a difference between the first and second temperatures, and
   wherein the estimate of incident radiation on one of the first and second thermocouples is used to determine a corrected temperature of the gas stream.

2. A device according to claim 1, further comprising a tip, wherein the first and second thermocouples are mounted on the body equidistant from the tip.

3. A device according to claim 2, further comprising a third thermocouple mounted on the tip.

4. A device according to claim 1, wherein the radiation shield is semi-circular in cross-sectional shape.

5. A device according to claim 1, wherein the first thermocouple is mounted on the body opposite the second thermocouple.

6. A method of measuring temperature by estimating and compensating for incident radiation, comprising the steps of:
   measuring a first temperature of a gas stream using a first thermocouple, the first thermocouple being shielded from incident radiation of the gas stream by a radiation shield;
   measuring a second temperature of the gas stream using a second thermocouple, the second thermocouple being unshielded from incident radiation of the gas stream;
   determining an estimate of incident radiation on one of the first and second thermocouples based on a difference between the first and second temperatures; and
   determining a corrected temperature of the gas stream based on the estimate of incident radiation.

7. A method according to claim 6, wherein the corrected temperature is determined by performing a finite element analysis.

8. A method of measuring temperature by estimating and compensating for incident radiation, comprising the steps of:
measuring a first temperature of a gas stream using a first thermocouple, the first thermocouple being shielded from incident radiation of the gas stream by a radiation shield;
measuring a second temperature of the gas stream using a second thermocouple, the second thermocouple being unshielded from incident radiation of the gas stream;
determining a difference between the measured first and second temperatures;
determining a temperature of the radiation shield based on the first and second temperatures;
determining an estimate of incident radiation on the first and second thermocouples; and
determining a corrected temperature of a gas stream based on the estimate of incident radiation.

9. A method according to claim 8, wherein the temperature of the radiation shield is determined by performing a finite element analysis.

* * * * *

UNITED STATES PATENT AND TRADEMARK OFFICE
CERTIFICATE OF CORRECTION

| | |
|---|---|
| PATENT NO. | : 7,824,100 B2 |
| APPLICATION NO. | : 11/835912 |
| DATED | : November 2, 2010 |
| INVENTOR(S) | : Sakami et al. |

Page 1 of 1

It is certified that error appears in the above-identified patent and that said Letters Patent is hereby corrected as shown below:

On the Title Page, Item (75), under "Inventors", Line 7,
delete "Aaton" and insert -- Aaron --, therefor.

Signed and Sealed this
Thirty-first Day of May, 2011

David J. Kappos
*Director of the United States Patent and Trademark Office*